United States Patent [19]
Bals

[11] 3,936,653
[45] Feb. 3, 1976

[54] PROCESS AND DEVICE FOR CUTTING ELECTRICALLY CONDUCTIVE MATERIAL WORKPIECES

[76] Inventor: Hans Gunter Bals, Blumgesgrundstrasse 44, Gelnhausen-Hailer, Germany

[22] Filed: Mar. 25, 1974

[21] Appl. No.: 454,703

[30] Foreign Application Priority Data
Mar. 27, 1973 Germany............................ 2315095

[52] U.S. Cl. ................ 219/68; 74/230.6; 219/69 V
[51] Int. Cl.² ........................................ B23P 1/12
[58] Field of Search ........... 219/68, 69 V; 74/230.6; 200/289

[56] References Cited
UNITED STATES PATENTS

| | | | |
|---|---|---|---|
| 1,433,828 | 10/1922 | Kimble | 74/230.6 |
| 2,802,929 | 8/1957 | Fefer | 219/69 V |
| 2,906,853 | 9/1959 | Sibley | 219/69 V |
| 2,974,216 | 3/1961 | Inoue | 219/69 V X |
| 3,731,044 | 5/1973 | Ullmann, et al. | 219/69 |
| 3,830,996 | 8/1974 | Ullmann et al. | 219/69 V |

FOREIGN PATENTS OR APPLICATIONS
157,017  12/1904  Germany ........................ 74/230.6

*Primary Examiner*—J. V. Truhe
*Assistant Examiner*—N. D. Herkamp
*Attorney, Agent, or Firm*—Larson, Taylor and Hinds

[57] ABSTRACT

A process and device for cutting an electrically conductive workpiece. The workpiece is moved relative to an endless circulating electrode while an electrical voltage is applied to the electrode and the workpiece sufficient to form an arc therebetween for melting the material of the workpiece, which melted material is then carried away by the circulating electrode. The electrode may also oscillate in the direction of relative movement and/or the electrical voltage may be interrupted at certain times such as when the electrode is operable to carry away the melted workpiece material.

18 Claims, 5 Drawing Figures

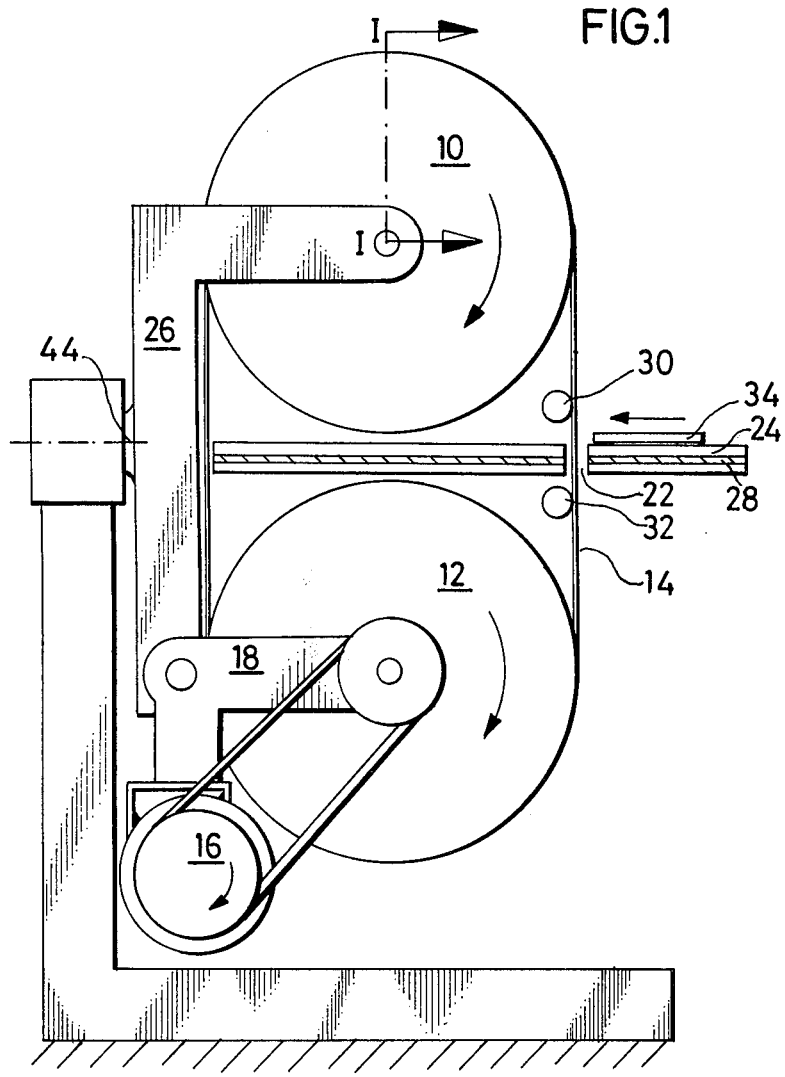

PROCESS AND DEVICE FOR CUTTING ELECTRICALLY CONDUCTIVE MATERIAL WORKPIECES

BACKGROUND OF THE INVENTION

The invention concerns a process for separation and cutting to size of electrically conductive materials, primarily metals, for almost the whole processing industry.

The problem that is basic to it is the finding of the simplest possible universally applicable process and a corresponding device, to be able to cut if possible all electrically conductive materials with a solid aggregate state into arbitrary contours, independently of their hardness, to the narrowest possible cut width.

SUMMARY OF THE INVENTION

This problem is solved in terms of the present invention by a process whereby a sufficiently strong electrical voltage is applied to the material that is to be cut and to a circulating endless electrode, to produce an arc at the cutting place which will heat the material, whereby the material melted by the arc will be removed mechanically by the electrode.

The advantages that can be attained with this invention consist especially in that because of the high temperature in the arc and the supplementary frictionally removing action of the electrode, any known electrically conducting material may be cut by this process, and the cut width itself can be kept narrow, with very great cutting depths, so that practically any contour can be cut, even with a relatively small radius.

Other objects and advantages of the present invention will become apparent from the detailed description to follow.

BRIEF DESCRIPTION OF THE DRAWINGS

There follows a detailed description of a preferred embodiment of the invention to be read together with the accompanying drawings in which:

FIG. 1 is a side elevational view of a device for cutting electrically conductive work pieces in accordance with the features of the present invention.

DETAILED DESCRIPTION OF THE PREFERRED EMBODIMENTS

Figure 1A:
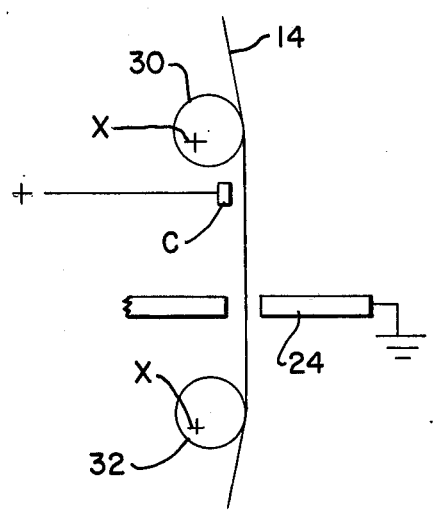
FIG. 1A is a diagram showing schematically a means for delivering current intermittently to electrode 14.

Referring now to the drawings, like elements are represented by like numerals throughout the several views.

A wire-shaped endless electrode 14 is guided over two rolls 10 and 12 which have parallel shafts and are disposed one above the other. Via the roll shafts and rolls 10 and 12, an electrical current from a welding transformer (not illustrated) is applied to electrode 14.

One of the rolls is driven by a motor 16.

By appropriate construction, here by the weight of roll 12 and motor 16 that are suspended in a swing 18, the electrode is tensioned between rolls 10 and 12.

Figure 2:
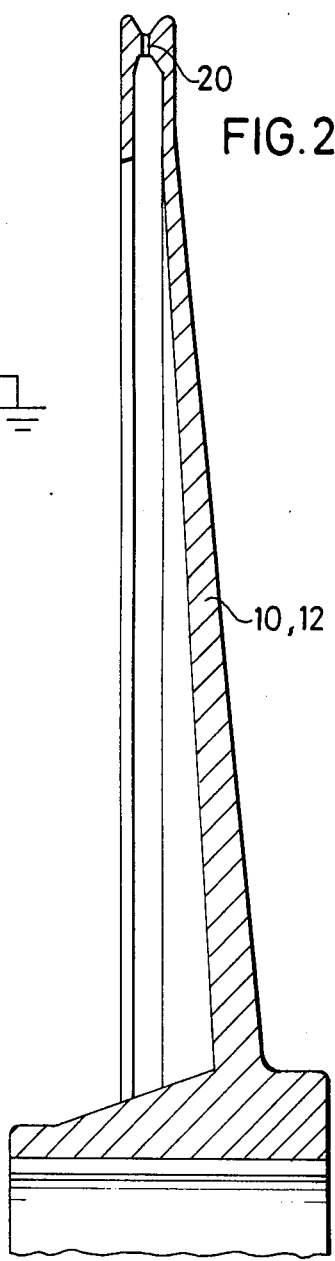
FIG. 2 is an enlarged cross-sectional view of a portion of FIG. 1, taken along line I—I of FIG. 1.

FIG. 2 shows a cutout in one of rolls 10;12 in section, as an example of an embodiment that allows or effects intense cooling of the electrode by means of radial cooling bores 20.

Figure 3:
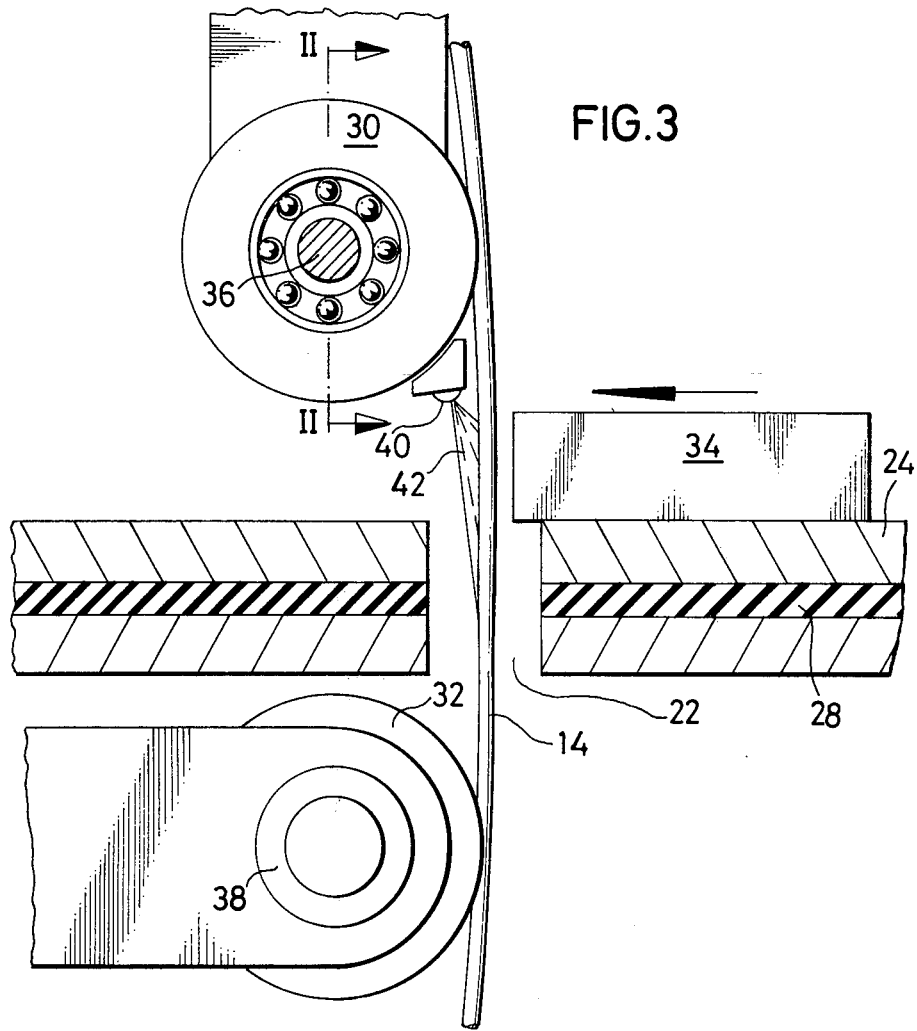
FIG. 3 is a greatly enlarged view of a portion of FIG. 1.
Figure 4:
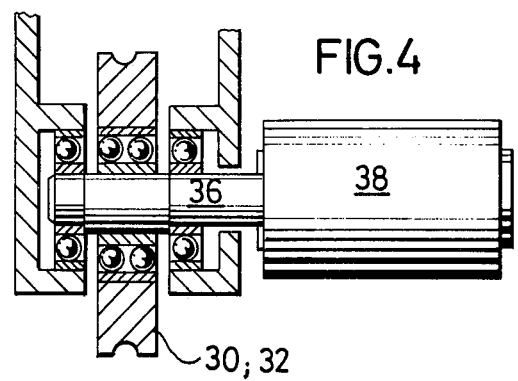
FIG. 4 is a cross-sectional view taken along line II—II of FIG. 3.

The electrode leads through holes 22 in a bearing plate 24. Plate 24 consists of electrically conductive material and is connected to the welding transformer ground. It constitutes the work table and is electrically insulated against frame 26 of the machine, among other things by means of a non-conductive layer 28. The rapidly circulating electrode 14 — it circulates at a speed of up to about 100 m/sec — is precisely guided in its working area by two smaller guide rolls 30 and 32 just above and just below the work table, and moved oscillatingly in the horizontal direction, with a small amplitude of swing (in the order of magnitude 1 mm) and at a frequency of about 1–50 cycles/sec against the direction of advance of workpiece 34. The oscillating movement is attained, as illustrated in FIGS. 3 and 4, by running rolls 30 and 32 respectively on eccentrically borne shafts 36, the two shafts being driven synchronously e.g. by synchro motors 38, with a selectable rpm.

With the same frequency as the oscillating movement of electrode 14, the electric voltage to line 14 is interrupted during the time of contact with workpiece 34, hence with reference to the cutting direction in the zone of the forward oscillation dead point. Control of the switching on and off of the voltage can be effected in a known way as a function of the angle of rotation of eccentrically borne shaft 36. FIG. 1A is a schematic representation of a means for switching on and off the current delivered to electrode 14. A line is shown therein for delivering current to a contact shown schematically at C which, in its position as shown, would not engage electrode 14, but which would then engage electrode 14 upon reciprocating movement of the electrode 14 to the left (i.e., using the term "left" as viewed in FIG. 1A) upon turning of the rollers 30 and 32 about the axes shown therein at X.

Compressed air or another gaseous jet 42 is blown through a nozzle 40, at a high velocity, in the direction of travel along electrode 14 in such a way that gaseous jet 42 in the work zone of electrode 14 only impinges on the part thereof that is not in contact with workpiece 34.

For more convenient operation, the machine may be equipped with a foot switch that smoothly controls the current.

Frame 26 that supports rolls 10, 12, 30 and 32 is borne so that it is swingable in a sector of about 50° at the level of work table 24, by means of a horizontal shaft 44, so that the direction of travel of electrode 14 can be varied in this sector with reference to work table 24.

The invention operates as follows. After electric motor 16 has accelerated drive roll 12 and electrode 14 and the other rolls 10, 30 and 32 to the rated speed, electrode 14 is impinged upon by the current of the welding transformer. Synchromotors 38 then start up, shifting electrode 14 in horizontal oscillation with an amplitude of about 1 mm via guide rolls 30 and 32. At the same time, compressed air issues through nozzle 40 against the back of electrode 14. Now workpiece 34 which, lying on work table 24, is connected to ground of the transformer, is moved toward electrode 14. There is an arc in the course of the first contact, during which contact electrode 14 is bent by workpiece 34 so far that the contact does not end before the electric voltage is switched on again. If the arc has enough energy, it heats the contact place on workpiece 34 very rapidly to a slight depth, so strongly that the material at this place becomes soft, plastic or even liquid. With the next contact by electrode 14 as it periodically swings backward and forward, this soft, plastic or liquid material is removed by the mechanically rubbing electrode 14, and then as electrode 14 swings back after a new arcing which is the consequence of the conductivity of the ions previously produced at the cutting point and still present there, the next layers of the contact place are heated and again removed by the forward swinging electrode, whereby the cutting process progresses.

Because the current is interrupted during the phase of contact of electrode 14 and the cut place of workpiece 34, a short circuit between electrode 14 and workpiece 34 that would reduce efficiency is prevented.

The standing arc first directed between workpiece 34 and electrode 14, as soon as electrode 14 has cut deeper into workpiece 34, would circulate around electrode 14 because a plasma would develop between it and the workpiece 34 that surrounds it at the cut.

To prevent this and the loss of efficiency caused thereby, the gas ions produced, which alone allow development and maintenance of an arc because of their conductivity, are continuously blown away by the compressed air or gas jet 42 that passes along through the workpiece cut to electrode 14, so that the arc cannot circulate about electrode 14 but remains standing, directed between it and the cut place in question.

The swing of frame 26 about shaft 44 has the effect that the workpiece can be cut without subsequent treatment with a weld chamfer, and also profiles can be cut with bevel or weld chamfer.

In an experimental setup similar to that shown in FIG. 1, the work was done with a roll diameter of 875 mm and a smooth endless round steel wire as electrode. The wire diameter was 2.5 mm. The peripheral speed of the rolls and thereby the electrode velocity was 50 m/sec. Oscillation amplitude developed by the two guide rolls was 0.8 mm, while the frequency was about 10 cycles/sec. The transformer, delivered a 220 amp current at 32 volts. A workpiece made of chromium-nickel-steel (9% nickel, 18% chromium) was cut, the piece being 11 mm thick. Cutting speed was ca 25 mm/sec. The workpiece showed no oxidation tinge at the cut edges. About 30 seconds after the cutting, it still had a temperature of 40° C in the region of the cut edges. The cut edges were straight. Cut roughness was about 50 $\mu$. Straight and curved cuts were made, up to a minimum diameter of 4 mm.

As further experiments have shown, it is not absolutely necessary to effect intermittent and alternating heating by arc, with the use of eccentrically borne guide rolls and the described periodic switching off of current and mechanical removal of the softened material. The work can also be done with the voltage applied constantly between the workpiece and the electrode and with the electrode running regularly. In this case however the cutting efficiency is limited because of short circuit losses.

If no shaped contours but only straight cuts are to be produced, the electrode can be a steel strip similar to the strap on a band saw. In this case it is advantageous to jacket the rear part of the strip with insulation. By building the forward edge with sawtoothlike projections, but with bigger spacing than in an ordinary saw band, the above described oscillation of the electrode may be omitted, whereby advantageously during engagement of a projection in the workpiece the electrical voltage is interrupted.

Although the invention has been described in considerable detail with respect to a preferred embodiment thereof, it will be apparent that the invention is capable of numerous modifications and variations apparent to those skilled in the art without departing from the spirit and scope of the invention.

I claim:

1. A process for cutting an electrically conductive workpiece, comprising the steps of:
   establishing relative movement in a cutting direction between the workpiece and a circulating endless electrode,
   and cyclically moving the electrode and the workpiece into and out of contact with each other at a cutting place on the workpiece, during at least a portion of each cycle applying between the electrode and the workpiece an electrical voltage strong enough to produce an arc therebetween which heats the workpiece to soften and melt the material thereof, and during a portion of said cycle as the workpiece and the element are moved into contact with each other, mechanically removing both softened and melted workpiece material by movement of the circulating electrode through the cutting place.

2. A process according to claim 1, said cyclical movement including oscillating the circulating electrode in the cutting direction independently of its circulating movement.

3. A process according to claim 2, including cutting off the said electrical voltage during those portions of the oscillating movement when the electrode is oscillated toward the workpiece.

4. A process according to claim 1, including switching off the electrical voltage during certain times as the electrode removes the softened and molten material.

5. A device for cutting an electrically conductive workpiece comprising:
   an endless electrode and means for mounting the electrode for circulating movement,
   means for mounting a workpiece for movement relative to the electrode in a cutting direction such that the electrode engages the workpiece at a cutting place,
   means for cyclically moving the electrode and the workpiece into and out of contact with each other,
   means for applying during at least a portion of each cycle an electrical voltage between the electrode and the workpiece to produce an arc which heats the workpiece to soften and melt the material thereof,
   said electrode being positioned relative to the cutting place of the workpiece to mechanically carry away both softened and melted workpiece material as it circulates through the cutting place, during a portion of the cyclic movement when the electrode and the workpiece are moving into contact with each other.

6. A device according to claim 5, wherein the electrode is an endless wire closed on itself.

7. A device according to claim 5, wherein the voltage source is a welding generator.

8. A device according to claim 5, said means for cyclically moving the workpiece and the electrode into and out of contact with each other including a pair of rolls mounted on a frame, said electode passing over said rolls, and said frame being swingable about a horizontal axis parallel to the direction of relative movement between the workpiece and the electrode to change the angular settings of the electrode relative to the workpiece.

9. A device according to claim 5, including means for directing a gaseous jet on the side of the electrode opposite from the side which engages the workpiece at the cutting place.

10. A device according to claim 5, including means for varying the circulating speed of the electrode.

11. A device according to claim 5, including a pair of rolls mounting said electrode, and wherein at least one of the rolls is provided with radial coolant channels immediately beneath the path of the electrode over that roll for cooling the electrode.

12. A device according to claim 5, said electrode being connected to a voltage source through at least one of said rolls.

13. A device according to claim 12, including means for switching off the electrical current during that phase of reciprocating movement of the electrode during which it removes molten material from the workpiece.

14. A device according to claim 13, including a control device operable as a function of the phase of reciprocating movement of the electrode for switching the voltage off and on.

15. A device according to claim 5, said means for cyclically moving the workpiece and the electrode into and out of contact with each other including means for periodically reciprocating the electrode independent of its circulating movement at the cutting place in the direction parallel to the direction of relative movement between the electrode and the workpiece.

16. A device according to claim 15, including at least one eccentrically mounted out-of-round guide roll, said guide roll being movable against the electrode for providing said reciprocating movement.

17. A device according to claim 5, wherein the electrode is a strip of steel.

18. A device according to claim 17, wherein said strip includes sawtooth-like projections on the edge thereof facing the workpiece.

* * * * *